United States Patent [19]

Corse

[11] Patent Number: 5,779,080
[45] Date of Patent: Jul. 14, 1998

[54] MULTI-PURPOSE BAKING PAN WITH HINGED END SECTIONS AND COVER

[76] Inventor: Kenneth J. Corse, P.O. Box 954, New Milford, Pa. 18834

[21] Appl. No.: 841,876

[22] Filed: May 5, 1997

[51] Int. Cl.[6] .................................................. B65D 6/24
[52] U.S. Cl. ..................... 220/4.28; 220/912; 220/533; 220/7
[58] Field of Search ........................... 220/912, 533, 220/527, DIG. 25, 7, 4.28

[56] References Cited

U.S. PATENT DOCUMENTS

| 985,712 | 2/1911 | Springer | 220/912 |
| 994,832 | 6/1911 | Hall | 220/912 |
| 1,172,189 | 2/1916 | Bauer | 220/4.28 |
| 2,598,789 | 6/1952 | Harrell | 220/912 |
| 3,019,333 | 1/1962 | Pascucci | 220/4.28 |
| 3,964,628 | 6/1976 | Wilson | 220/DIG. 25 |
| 4,113,225 | 9/1978 | Corse | 220/912 |
| 4,446,982 | 5/1984 | Corse . | |
| 5,303,823 | 4/1994 | Niles et al. | 220/7 |

FOREIGN PATENT DOCUMENTS 42 24 121   1/1994   Germany ...................... 220/4.28

*Primary Examiner*—Stephen J. Castellano
*Attorney, Agent, or Firm*—Salzman & Levy

[57] ABSTRACT

The invention features a multi-purpose baking pan having a pan portion for holding batter. A pastry holder is included to allow the user to bake differently-shaped pastries which can be inserted into the pan portion. The pan portion has a rectangular bottom wall with two side walls which extend integrally in the same direction from the bottom wall along the opposite edges. There are two end members, located at the short sides of the rectangular bottom, which each have a rod-like hinge pin. Rotating an end member, by grasping and raising the lower portion thereof, allows the user to slide out the pastry holder without damage to the pastries or to the user. The multi-purpose baking pan also has a cover to protect the pastries within the baking pan.

4 Claims, 5 Drawing Sheets

5,779,080

MULTI-PURPOSE BAKING PAN WITH HINGED END SECTIONS AND COVER

FIELD OF THE INVENTION

The present invention relates to utensils and, more particularly, to an improved baking pan with hinged end sections, a cover and movable partitions.

BACKGROUND OF THE INVENTION

The present invention is an improvement on the multi-purpose baking utensil inventions which are the subject of U.S. Pat. Nos. 4,113,225 and 4,446,982. The inventions which were the subject of the patents identified above had two end members which permitted the user to alter the size of the baking area, and the baked cake, within a baking pan.

A multi-purpose baking pan uses a pastry holder to allow the user to convert the common cake baking pan to a generally cupcake-shaped baking pan. In the prior art, in order to grasp and remove this pastry holder, the user was required to place a hand in between the baking pan and the pastry holder. This increased the likelihood of a burn from the hot baking pan. It also presented an awkward situation for the hands. Alternatively, the user could remove the pastry holder by flipping the pan over, which often resulted in damaged pastries. Thus, there is a need in the art for a multi-purpose baking pan that allows for safe, easy removal of the pastry holder.

Conventional baking pans are available generally in a range of common sizes, for example 9"×9" and 11"×13". This limits the sizes of the cakes that the user can bake. Should a user desire to bake a cake of a non-standard size, he or she must either buy a plethora of baking pans or cut the cake to the desired size. Not only is this problem costly, but it can also waste cake. Thus, there is a need in the art for a multi-purpose baking pan that allows the user to create differently-sized cakes.

Once the pastry inside of the multi-purpose baking pan is finished, the user may wish to transport the cake without harm or seal the pastry to retain freshness. The prior art does not provide any means to protect the pastry. Thus there is a need in the art for a multi-purpose baking pan that provides protection for the pastry.

SUMMARY OF THE INVENTION

In accordance with the present invention, there is provided a multi-purpose baking pan having a pan portion for holding batter. A pastry holder is included to allow the user to bake differently-shaped pastries which can be inserted into the pan portion.

The pan portion has a rectangular bottom wall with two side walls which extend integrally in the same direction from the bottom wall along the opposite edges. Two end members, located at the short sides of the rectangular bottom, each have a rod-like hinge pin for insertion in one of a pair of openings located on the side edges. The side edges and end members are tightly engaged with the bottom wall of the cake pan, providing a batter tight seal. The user causes the end member to be rotated or swiveled by grasping and raising the lower portion of the end member. This allows the user to slide out the pastry holder without damage to the pastries or to the user.

Once the pastry holder is removed, the user can secure the end member into place by returning it to its original position. Each end member has a hole in its bottom lip in order to engage a detent catch located on the bottom pan member.

The multi-purpose baking pan also has a slidable rectangular cover, which may be used to protect the pastries within the baking pan.

It is a primary object of the present invention to provide a multi-purpose baking utensil which includes a closed end pan having pivoting end pieces, with a rod-like hinge pin, each end piece being mounted within a pair of openings in the pan.

It is a further object of the present invention to provide a multi-purpose baking utensil which includes a closed end pan having pivoting end pieces.

It is a further object of the present invention to provide a multi-purpose baking utensil which includes a closed end pan having an L-shaped divider with a bottom side and a side edge. The divider is adapted to fit within the pan to adapt the multi-purpose baking utensil for baking a plurality of individual pastries of a shape consistent with the position of the divider.

It is a further object of the present invention to provide a multi-purpose baking utensil which includes a closed end pan having a cover.

These and other objects of this invention will become more apparent, and will be better understood with reference to the subsequent detailed description considered in conjunction with the accompanying drawings.

BRIEF DESCRIPTION OF THE DRAWINGS

A complete understanding of the present invention may be obtained by reference to the accompanying drawings, when considered in conjunction with the subsequent, detailed description, in which.

DETAILED DESCRIPTION OF THE PREFERRED EMBODIMENT

Figure 1:
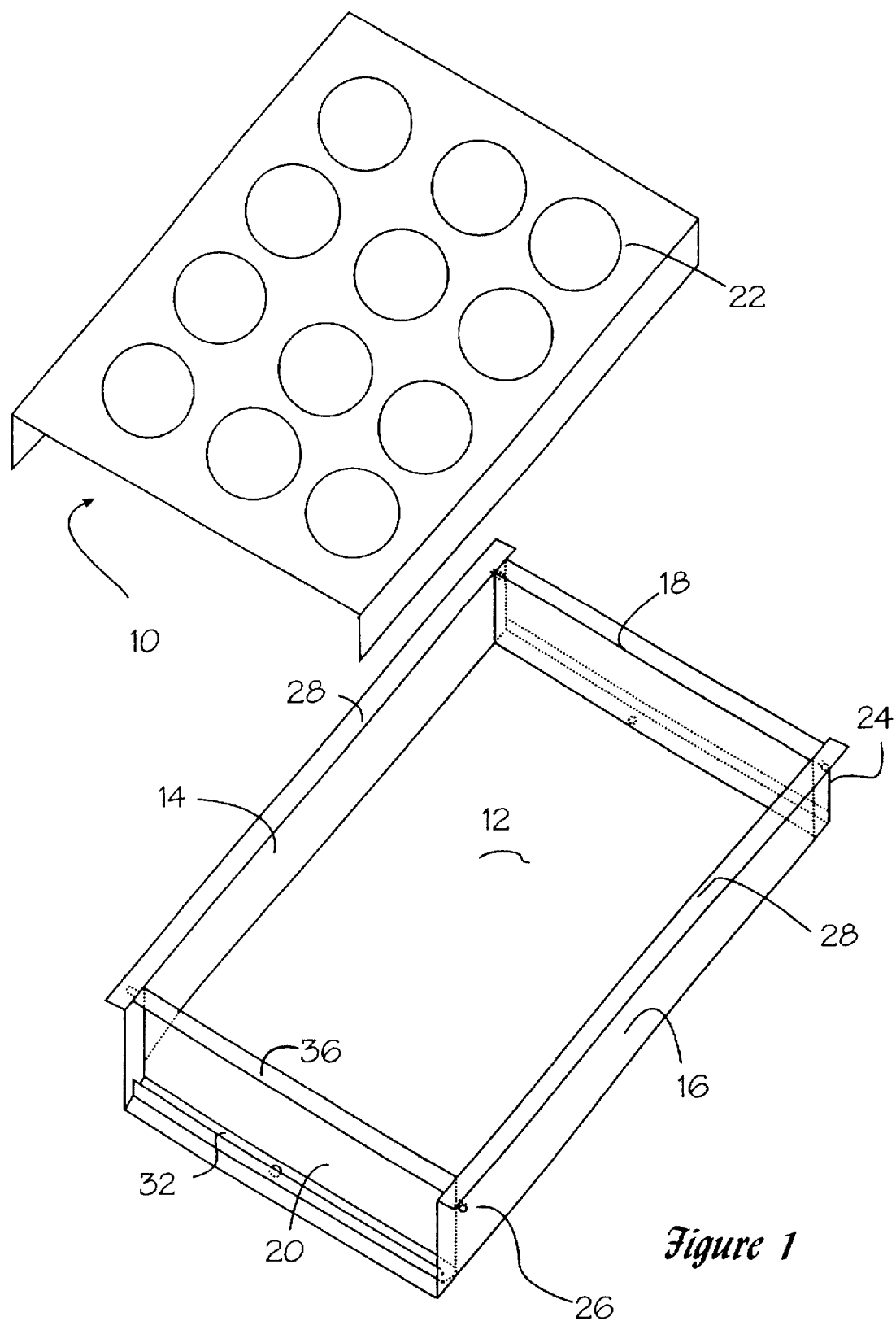
FIG. 1 is an exploded isometric view of a multi-purpose baking utensil according to the present invention showing the relative positions of each of the component parts.

Referring now to FIG. 1, a preferred embodiment of the inventive multi-purpose baking pan will be described. It should be noted that the embodiment of the invention to be described is an improvement over the inventor's prior baking pan inventions which were the subject of U.S. Pat. Nos. 4,113,225 and 4,446,982.

Multi-purpose baking pan 10 shown in FIG. 1 includes a bottom 12, a pair of side walls 14 and 16, a pair of ends 18 and 20, and a removable pastry holder 22. Side walls 14 and 16 run along the longer dimensions of the bottom 12. The bottom 12 is curved upwardly to provide a convex surface in the direction of the side walls 14 and 16, which side walls are tightly engaged with the bottom 12, to form a batter-tight seal. Moreover, the bottom 12 is manufactured from resiliently flexible material to permit a user to urge the convex surface toward a planar configuration. A pair of openings 24 and 26 is located at opposite ends of the side walls 14 and 16, respectively, to provide pairs of openings directly opposite one another. Each side wall 14 and 16 has an upper lip 28 to provide strength and ease of handling to the baking pan 10.

End members 18 and 20 run along the shorter dimensions of the bottom 12. Each end member 18 and 20 has a substantially parallel top edge 36 and bottom edge 32.

Figure 2:
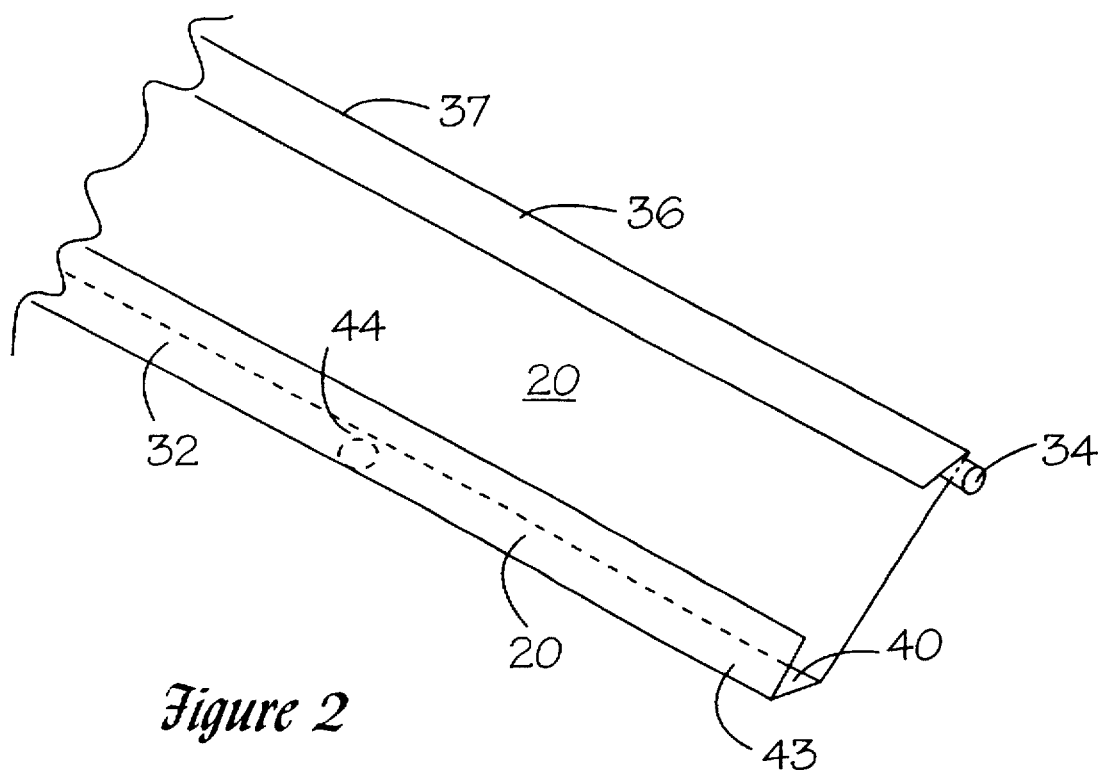
FIG. 2 is a side elevational view of the removable end member of a multi-purpose baking utensil as shown in FIG. 1.

Referring now to FIG. 2, each identical end member 18 and 20 (FIG. 2) has channel-like strengthening lips 37 and 42 along the top and bottom edges 36 and 32 to provide support to each end member 18 and 20. Bottom channel-like strengthening lip 42 has a bottom surface 40 and a flange 43. The bottom surface 40 has a hole 44 for engaging the detent catch on the bottom 12 of the pan 10, thereby holding the end members 18 and 20 in place. Each end member 18 and 20 has a rod-like hinge pin 34 for rotatively mounting in one of the pairs of openings 24 and 26 (FIG. 1).

Figure 3:
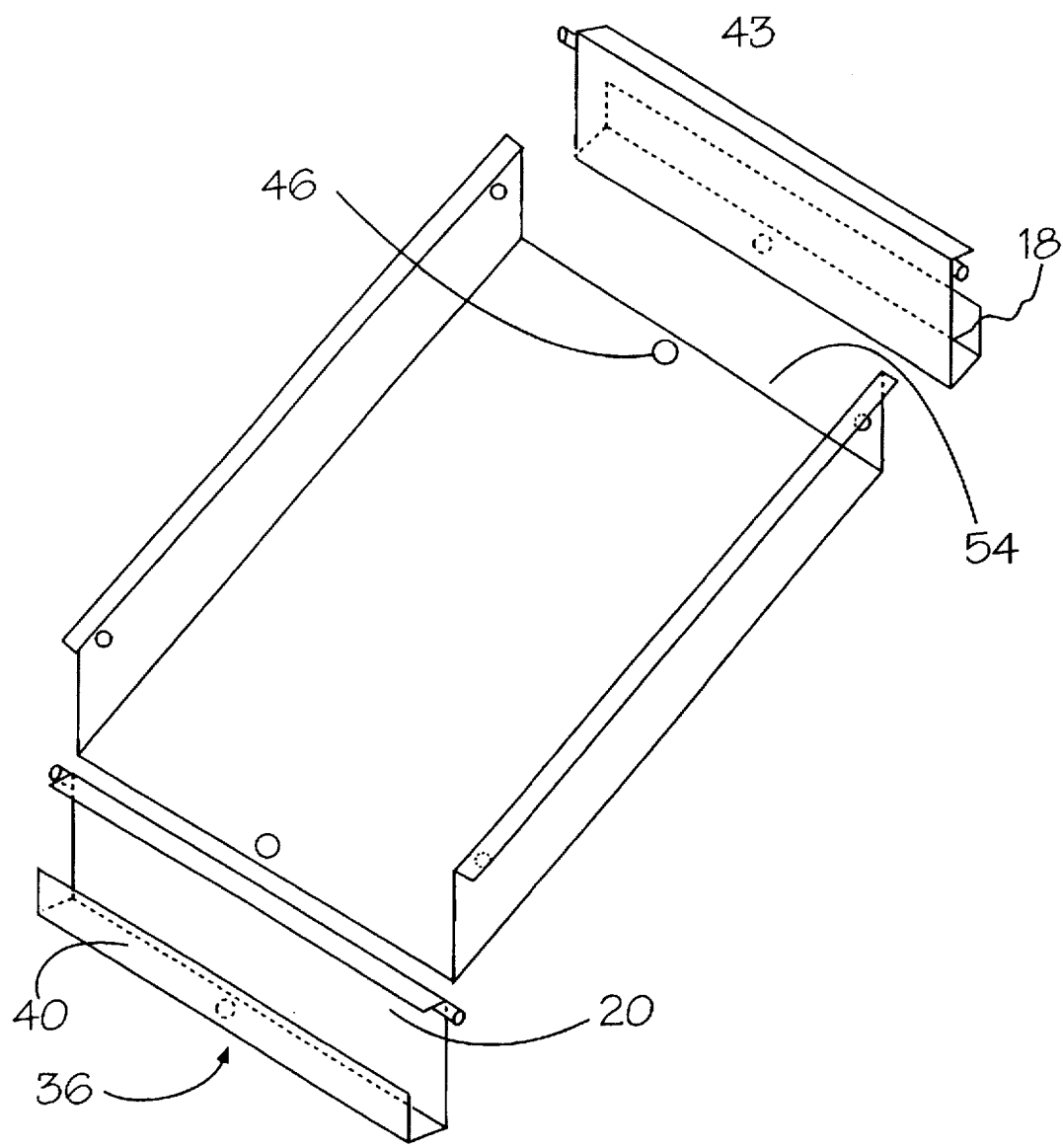
FIG. 3 is an isometric view of a multi-purpose baking pan showing end pieces sliding an insert out of the bottom pan.

Referring now to FIG. 3, the ease of use of the multi-purpose baking pan 10 can be demonstrated. As mentioned previously, the multi-purpose baking pan 10 has an insert 22 which allows the user, not shown, to make cupcakes, for example. In order to make the removal of the insert 22 (as shown in FIG. 1) easier, the multi-purpose baking pan 10 has rotatably mounted end members 18 and 20. The user causes the end members 18 and 20 to pivot by grasping and raising the lower lip 42 thereof. The opening 54 created by pivoting the end members 18 and 20 allows the user to slide out the insert 22 without damaging the baked goods contained therein.

Once the baked goods are removed, the user can secure the end members 18 and 20 into place by returning the end members 18 and 20 to their original position, causing the bottom surface 40 to engage the detent catch 46.

Figure 4:
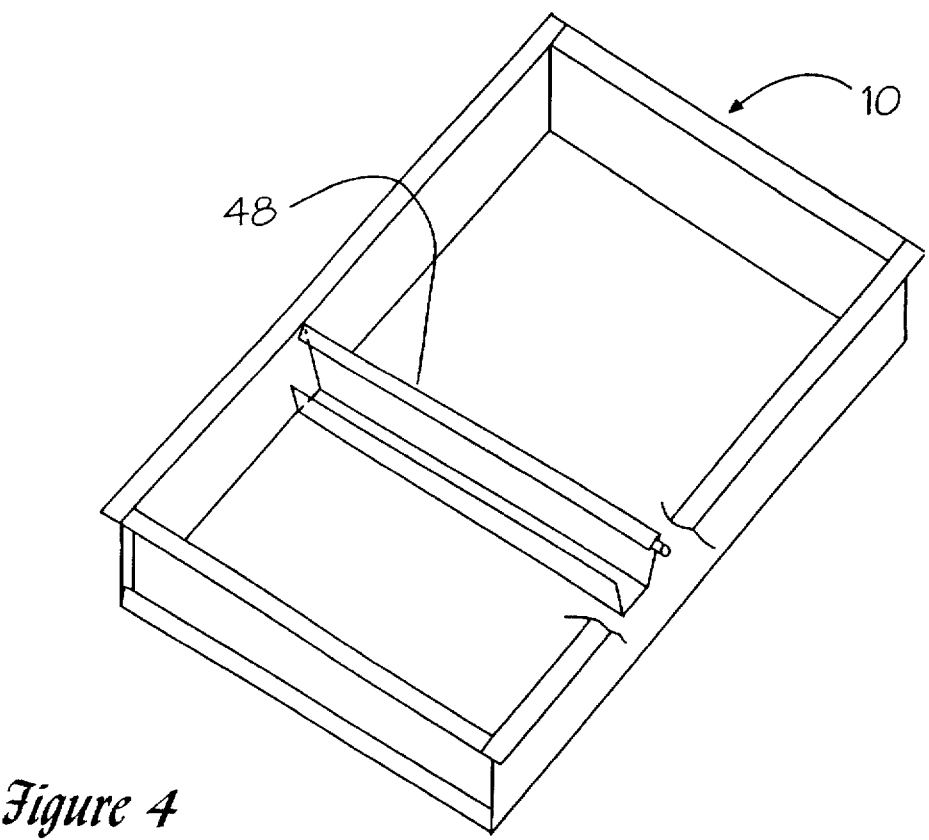
FIG. 4 is an isometric view of a multi-purpose baking pan showing a divider positioned with respect to the bottom pan for baking two substantially square cakes.
Figure 5:
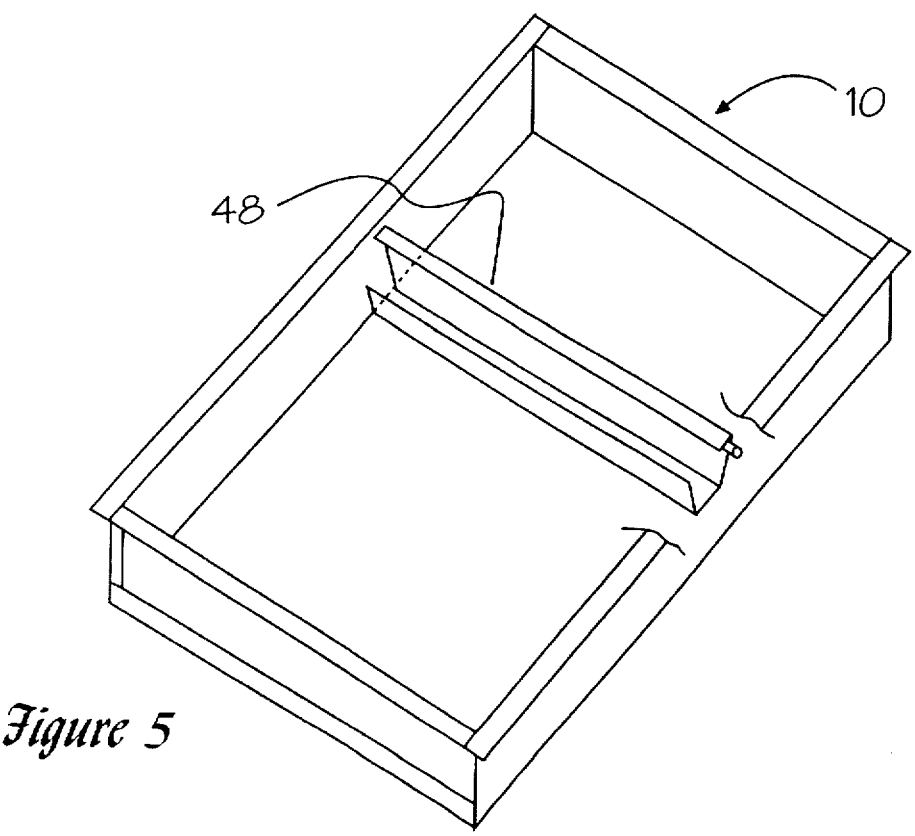
FIG. 5 is an isometric view of a multi-purpose baking pan showing a divider positioned with respect to the bottom pan for baking one loaf cake and one rectangular cake.

Referring now to FIGS. 4 and 5, the versatility of the multi-purpose baking pan 10 can be further described. In its simplest embodiment, the baking pan 10 forms a rectangle, measuring approximately 9×13 inches. However, it may be desirable to produce cakes and pastries of different sizes. Since baking pans are usually configured in the standard 9"×13" size, cakes of different sizes would normally require pans of several different sizes.

FIG. 4 shows a view of the multi-purpose baking pan 10 having a divider 48. The divider 48 is an L-shaped member that is used to adjust the size of the baking pan 10. The user controls the size of the baking area and finished cake by positioning the divider 48 in the appropriate position. By placing the divider 48 in the center of the baking pan 10, the baking pan 10 produces two cakes of substantially the same size.

The baking pan 10, as shown in FIG. 5, would produce a substantially square cake and a loaf cake. This is accomplished by displacing the divider 48 from the center of the pan 10. It can be appreciated that the divider 48 can be positioned in many different ways in the pan 10 to produce a variety of cake sizes.

Figure 6:
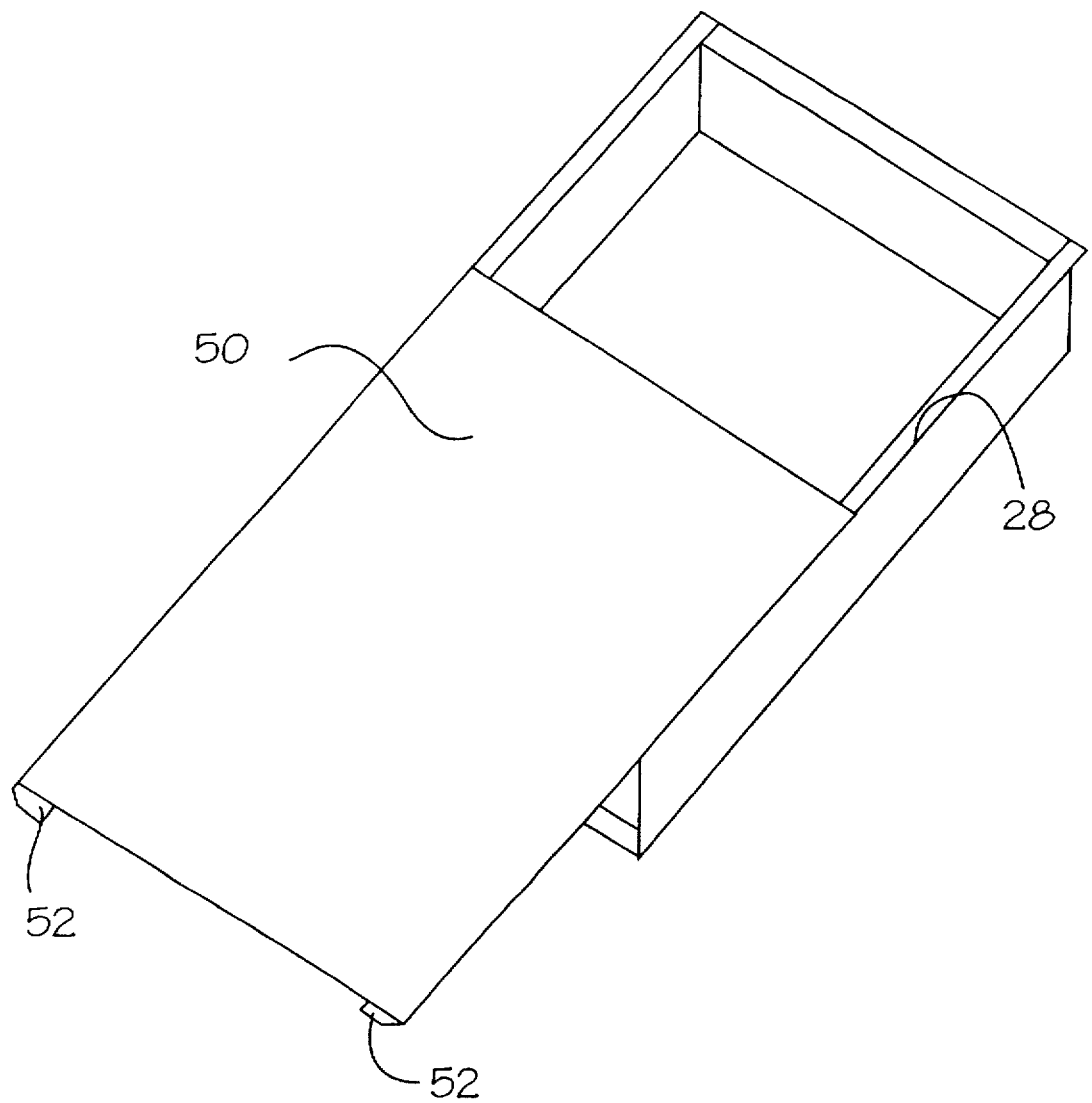
FIG. 6 is an isometric view of a multi-purpose baking pan showing a cover positioned with respect to the bottom pan.

Now referring to FIG. 6, the multi-purpose baking pan 10 is shown with a cover 50. The cover 50 may be used to protect the pastries, not shown, within the baking pan 10. The cover 50 has two longitudinally-extending flanges 52 which are used to engage the upper flanges 28 of the baking pan 10. The upper flanges 28 are further used to aid the user in sliding the cover 50 into place and are also provided for ease in handling the pan 10.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented by the subsequently appended claims.

What is claimed is:

1. A baking utensil selectively adaptable to contain batter for producing baked goods of a plurality of sizes and shapes, said utensil comprising:

a) a pan portion including a substantially rectangular bottom wall with two side walls extending integrally in the same direction from said bottom wall along opposite edges thereof, for equal distances to provide substantially parallel top edges of said side walls;

b) a detent catch disposed on said rectangular bottom wall;

c) a pair of openings through each of said side walls disposed at opposite ends thereof to provide pairs of openings directly opposite one another along said side walls adjacent said top edges thereof; and d) an end member having substantially parallel top and bottom edges, and a hinge for mounting in one of said opposite pairs of openings, said end member including a channel-like strengthening flange along said top and bottom edges to add strength and rigidity to said utensil, said channel-like flange having a bottom surface and a side edge, said bottom surface having an aperture therethrough for engaging said detent catch.

2. The baking utensil according to claim 1, further including an L-shaped divider, said divider having a bottom side and a side edge, said side edge being tightly engaged with said side walls and said bottom side being tightly engaged with said bottom wall, whereby said divider forms a batter-tight seal with said side and bottom walls.

3. The baking utensil according to claim 1, further including a cover.

4. The baking utensil according to claim 3, wherein said cover is slidably mounted with respect to said side edges.

* * * * *